(12) United States Patent
Huh et al.

(10) Patent No.: US 11,782,544 B2
(45) Date of Patent: Oct. 10, 2023

(54) IMAGE DISPLAY DEVICE WITH TOUCH SENSOR AND ANTENNA ELECTRODE AT THE SAME LEVEL

(71) Applicants: DONGWOO FINE-CHEM CO., LTD., Jeollabuk-do (KR); POSTECH RESEARCH AND BUSINESS DEVELOPMENT FOUNDATION, Gyeongsangbuk-do (KR)

(72) Inventors: Yoon Ho Huh, Seoul (KR); Dong Pil Park, Incheon (KR); Young Jun Lee, Seoul (KR); Won Bin Hong, Seoul (KR)

(73) Assignees: DONGWOO FINE-CHEM CO., LTD., Jeollabuk-Do (KR); POSTECH RESEARCH AND BUSINESS DEVELOPMENT FOUNDATION, Gyeongsangbuk-Do (KR)

( * ) Notice: Subject to any disclaimer, the term of this patent is extended or adjusted under 35 U.S.C. 154(b) by 162 days.

(21) Appl. No.: 17/408,906

(22) Filed: Aug. 23, 2021

(65) Prior Publication Data
US 2021/0382573 A1 Dec. 9, 2021

Related U.S. Application Data

(63) Continuation of application No. PCT/KR2020/002403, filed on Feb. 19, 2020.

(30) Foreign Application Priority Data

Feb. 21, 2019 (KR) .................. 10-2019-0020475

(51) Int. Cl.
*G06F 3/041* (2006.01)
*G06F 3/044* (2006.01)
(Continued)

(52) U.S. Cl.
CPC .......... *G06F 3/0412* (2013.01); *G06F 3/0446* (2019.05); *H01Q 1/243* (2013.01); *H01Q 1/38* (2013.01); *G06F 2203/04111* (2013.01)

(58) Field of Classification Search
CPC ........ G06F 3/0412; G06F 3/0446; H01Q 1/38
See application file for complete search history.

(56) References Cited

U.S. PATENT DOCUMENTS 11,494,009 B2 * 11/2022 Dan ..................... H01Q 9/42
2014/0106684 A1 * 4/2014 Burns .................. H01Q 21/28
29/601

(Continued)

FOREIGN PATENT DOCUMENTS

JP 2000-138512 A 5/2000
JP 2006-197646 A 7/2006

(Continued)

OTHER PUBLICATIONS

International Search Report for PCT/KR2020/002403 dated Jun. 8, 2020.

*Primary Examiner* — Liliana Cerullo
(74) *Attorney, Agent, or Firm* — The PL Law Group, PLLC

(57) ABSTRACT

An image display device according to an embodiment of the present disclosure includes a display panel, a touch sensor structure and an antenna electrode layer. The display panel includes a panel substrate, and an electrode structure and an insulation structure stacked on the panel substrate. The touch sensor structure is disposed on the display panel. The antenna electrode layer is disposed on the display panel at the same level as that of the touch sensor structure and at least partially overlaps the electrode structure of the display panel in a thickness direction. The antennal electrode layer is disposed in consideration of an electrode construction of (Continued)

the display panel and the touch sensor structure to provide a thin-layered image display device with high reliability.

10 Claims, 3 Drawing Sheets

(51) Int. Cl.
  *H01Q 1/24* (2006.01)
  *H01Q 1/38* (2006.01)

(56) References Cited

U.S. PATENT DOCUMENTS

| | | | |
|---|---|---|---|
| 2016/0188092 A1* | 6/2016 | Sebastian | H01Q 1/2258 |
| | | | 345/174 |
| 2016/0328057 A1* | 11/2016 | Chai | G06F 3/0412 |
| 2019/0220123 A1* | 7/2019 | Kanaya | G06F 1/1626 |
| 2020/0209995 A1* | 7/2020 | So | H01Q 1/24 |
| 2020/0343314 A1* | 10/2020 | Nakamura | H01Q 1/2208 |
| 2021/0200379 A1* | 7/2021 | Youk | G06F 3/0412 |

FOREIGN PATENT DOCUMENTS

| | | |
|---|---|---|
| KR | 10-2003-0095557 A | 12/2003 |
| KR | 10-2016-0029468 A | 3/2016 |
| KR | 10-2018-0101064 A | 9/2018 |
| KR | 10-1940798 B1 | 1/2019 |
| WO | WO 2013/063176 A1 | 5/2013 |

* cited by examiner

IMAGE DISPLAY DEVICE WITH TOUCH SENSOR AND ANTENNA ELECTRODE AT THE SAME LEVEL

PRIORITY

The present application is a continuation application to International Application No. PCT/KR2020/002403 with an International Filing Date of Feb. 19, 2020, which claims the benefit of Korean Patent Applications No. 10-2019-0020475 filed on Feb. 21, 2019 at the Korean Intellectual Property Office, the disclosures of which are incorporated by reference herein in their entirety.

BACKGROUND

1. Field

The present invention relates to an image display device. More particularly, the present invention related to an image display device including a touch sensor and an antenna.

2. Description of the Related Art

As information technologies have been developed, a wireless communication technology such as Wi-Fi, Bluetooth, etc., is combined with an image display device in, e.g., a smartphone. In this case, an antenna may be combined with the image display device to provide a communication function.

Mobile communication technologies have been rapidly developed, and an antenna capable of operating an ultra-high frequency communication is needed in the image display device.

A touch panel or a touch sensor capable of inputting a user's direction by selecting an instruction displayed on a screen with a finger or an inputting tool is also developed. The touch panel or the touch sensor may be combined with the image display device so that display and information input functions may be implemented in one electronic device. For example, as disclosed in Korean Patent Application Publication No. 2014-0092366, various image display devices combined with a touch screen panel including a touch sensor has been developed recently As the antenna and the touch sensor may be included in one image display device, proper mounting space may not be sufficiently obtained. Electrical properties of the antenna, the touch sensor and a display panel may also be disturbed due to mutual signal interruptions.

For example, Korean Patent Application Publication No. 2003-0095557 discloses an antenna structure embedded in a portable terminal, but fails to consider compatibility with other electrical elements such as the touch sensor.

SUMMARY

According to an aspect of the present invention, there is provided an image display device in which touch sensor and antenna functions are combined with improved operation reliability and structural efficiency.

The above aspects of the present invention will be achieved by the following features or constructions:

(1) An image display device, comprising: a display panel including a panel substrate, and an electrode structure and an insulation structure stacked on the panel substrate; a touch sensor structure on the display panel; and an antenna electrode layer disposed on the display panel at the same level as that of the touch sensor structure, the antenna electrode layer at least partially overlapping the electrode structure of the display panel in a thickness direction.

(2) The image display device according to the above (1), wherein the electrode structure includes a gate electrode, a source electrode, a drain electrode and a pixel electrode.

(3) The image display device according to the above (2), wherein the electrode structure serves as a ground layer of the antenna electrode layer.

(4) The image display device according to the above (3), wherein the antenna electrode layer includes a radiator and the radiator entirely overlap the pixel electrode in a planar view.

(5) The image display device according to the above (1), wherein the touch sensor structure includes: first sensing electrodes and second sensing electrodes arranged along different directions crossing each other; and bridge electrodes electrically connecting the neighboring first sensing electrodes.

(6) The image display device according to the above (5), wherein the antenna electrode layer and the bridge electrode are disposed at the same level and include the same metal.

(7) The image display device according to the above (5), further comprising a capping layer on a portion of the antenna electrode layer, wherein the capping layer is disposed at the same level as that of the first and second sensing electrodes, and includes a transparent metal oxide.

(8) The image display device according to the above (7), wherein the antenna electrode layer includes a radiator, a transmission line extending from the radiator and a signal pad connected to an end portion of the transmission line, wherein the capping layer is disposed on the signal pad.

(9) The image display device according to the above (8), further comprising a ground pad disposed around the signal pad to be electrically separated from the signal pad and the transmission line.

(10) The image display device according to the above (1), further comprising an encapsulation layer disposed between the display panel and the antenna electrode layer.

(11) The image display device according to the above (10), wherein the encapsulation layer serves as a dielectric layer of the antenna electrode layer.

(12) The image display device according to the above (10), wherein the insulation structure of the display panel includes a gate insulation layer, an insulating interlayer, a via insulation layer and a pixel defining layer sequentially stacked on the panel substrate, wherein at least a portion of the insulation structure serves as the dielectric layer of the antenna electrode layer together with the encapsulation layer.

(13) The image display device according to the above (10), wherein the touch sensor structure is disposed on a central portion of the encapsulation layer, and the antenna electrode layer is disposed on a peripheral portion of the encapsulation layer.

In an image display device according to exemplary embodiments of the present invention, an antenna and a touch sensor structure may be stacked together on a display panel to improve a spatial efficiency.

An insulation structure or an encapsulation layer included in a display panel may be utilized as a dielectric layer of the antenna. Further, a pixel electrode and/or an electrode structure of a thin film transistor (TFT) included in the display panel may be utilized as a ground electrode of the antenna. Thus, an antenna driving can be implemented without forming an additional dielectric layer and an additional ground electrode, and the spatial efficiency may be further enhanced without changing a desired driving property of the display panel.

In exemplary embodiments, a radiator of the antenna may be formed at the same level or the same layer as that of electrode of the touch sensor structure. Thus, signal disturbance and impedance mismatching between the antenna and the touch sensor structure may be prevented, and an entire thickness of the image display device may be decreased.

DETAILED DESCRIPTION OF THE EMBODIMENTS

According to exemplary embodiments of the present invention, there is a provided an image display device including an antenna and a touch sensor structure to have improved spatial efficiency and operational reliability.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
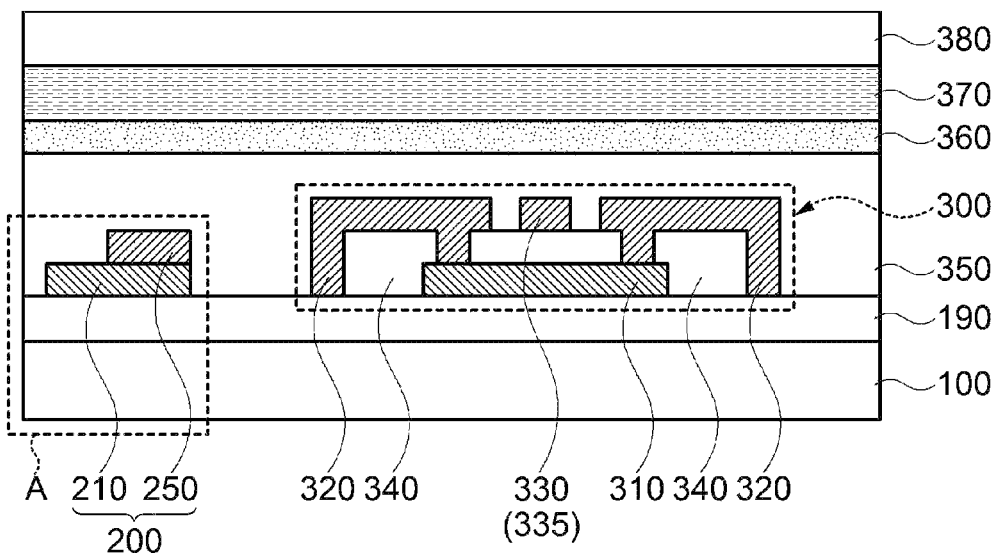
FIG. 1 is a schematic cross-sectional view illustrating an image display device in accordance with exemplary embodiments.

FIG. 1 is a schematic cross-sectional view illustrating an image display device in accordance with exemplary embodiments.

Referring to FIG. 1, the image display device includes a display panel 100, and an antenna pattern 200 and a touch sensor structure 300 stacked on the display panel 100.

The display panel 100 may include, for example, a thin film transistor (TFT) array substrate or a back-plane substrate of a display device such as an organic light emitting diode (OLED) display device or a liquid crystal display device (LCD). Structures and constructions of the display panel 100 will be described in more detail with reference to FIG. 2.

An encapsulation layer 190 may be disposed on the display panel 100. The encapsulation layer 190 may include an inorganic insulating material, an organic insulating material, or an organic-inorganic hybrid film. The encapsulation layer 190 may serve as a sealing layer that may protect the TFT, electrodes and a display layer included in the display panel 100. In an embodiment, the encapsulation layer 190 may be included as a component or a member of the display panel 100.

The antenna pattern 200 and the touch sensor structure 300 may be disposed on the encapsulation layer 190. In exemplary embodiments, the antenna pattern 200 and the touch sensor structure 300 may be located at the same layer or at the same level. In some embodiments, the antenna pattern 200 and the touch sensor structure 300 may be formed directly on the encapsulation layer 190.

The antenna pattern 200 may include an antenna electrode layer 210 and a capping layer 250 formed on the antenna electrode layer 210.

The touch sensor structure 300 may include a first sensing electrode 320, a second sensing electrode 330, an insulation pattern 340, and a bridge electrode 310.

The touch sensor structure 300 may be disposed in a display area or an active area including a central portion of the image display device. The antenna pattern 200 may be disposed in a peripheral area of the display area or the active area.

For example, the peripheral area may correspond to a non-display area or a bezel area of the image display device. The antenna pattern 200 and the touch sensor structure 300 may be disposed at the same level by using the peripheral area so that a spatial utilization may be improved while reducing a thickness of the image display device.

Additionally, the antenna pattern 200 and the touch sensor structure 300 may be horizontally disposed on the same plane, so that signal interference and parasitic capacitance between the antenna electrode layer 210 and the sensing electrodes 320 and 330 may be suppressed.

In exemplary embodiments, the antenna electrode layer 210 and the bridge electrode 310 may include the same material and may be formed together by the same patterning process. In some embodiments, the antenna electrode layer 210 and the bridge electrode 310 may be formed by the same patterning process using a low resistance metal such as silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals.

For example, the antenna electrode layer 210 and the bridge electrode 310 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit 210 and the bridge electrode 310 may include a transparent conductive oxide such as indium tin oxide (ITO), indium zinc oxide (IZO), tin oxide ($SnO_x$), zinc oxide ($ZnO_x$), indium zinc tin oxide (IZTO), etc.

In some embodiments, the antenna unit 210 and the bridge electrode 310 may include a stacked structure of a transparent conductive oxide layer and a metal layer. For example, the antenna unit 210 and the bridge electrode 310 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In exemplary embodiments, the capping layer 250 may be a conductive pattern selectively formed only on a portion of the antenna electrode layer 210. As illustrated in FIG. 1, the capping layer 250 may be disposed at the same plane or at the same level as that of the sensing electrodes 320 and 330. In an embodiment, the capping layer 250 may not extend to a touch sensing area or a touch active area in which the sensing electrodes 320 and 330 are formed, and may be selectively formed only on the antenna electrode layer 200.

In some embodiments, the capping layer 250 of the antenna pattern 200 and the sensing electrodes 320 and 330 of the touch sensor structure 300 may include the same material and may be formed together by the same patterning process. In some embodiments, the capping layer 250 and the sensing electrodes 320 and 330 may be formed by the same etching process from a conductive layer containing a transparent metal oxide such as indium tin oxide (ITO), indium zinc oxide (IZO), indium zinc oxide (ITZO), zinc oxide (ZnOx), etc.

The capping layer 250 including the transparent metal oxide that may have relatively improved resistance to corrosion and oxidation may be formed to cover a portion (e.g., a pad portion) of the antenna electrode layer 210. Thus, mechanical and chemical stability of the pad portion which may be exposed to an external air and moisture during a fabrication of the image display device may be improved.

Further, the capping layer 250 may be formed from the same process and material as those for the sensing electrodes 320 and 330 so that process convenience and productivity may be also improved.

Elements and structures of the antenna pattern 200 and the touch sensor structure 300 will be described in more detail with reference to FIGS. 3 and 5.

A passivation layer 350 may be formed on the encapsulation layer 190 to cover the antenna pattern 200 and the touch sensor structure 300.

A polarization layer 370 and a cover window 380 may be sequentially stacked on the passivation layer 350.

A polarization layer 370 may include a coating-type polarizer or a polarizing plate. The coating-type polarizer may include a liquid crystal coating layer including a polymerizable liquid crystal compound and a dichroic dye. In this case, the polarization layer 370 may further include an alignment layer for providing an orientation to the liquid crystal coating layer.

For example, the polarizing plate may include a polyvinyl alcohol-based polarizer and a protective film attached to at least one surface of the polyvinyl alcohol-based polarizer.

In some embodiments, the polarization layer 370 may be stacked on the passivation layer 350 by the adhesive layer 360. The adhesive layer 360 may include, e.g., an adhesive film such as an optically clear adhesive (OCA), an optically clear resin (OCR), or the like.

The cover window 380 may include glass or a hard coating film including a flexible resin material. In an embodiment, a light-shielding pattern (not illustrated) may be formed on a periphery of a bottom of the cover window 380. For example, the light-shielding pattern may include a color printing pattern, and a bezel area or a non-display area of the image display device may be defined by the light-shielding pattern. In an embodiment, as described above, the antenna pattern 200 may be disposed in the bezel area (e.g., under the light-shielding pattern).

Figure 2:
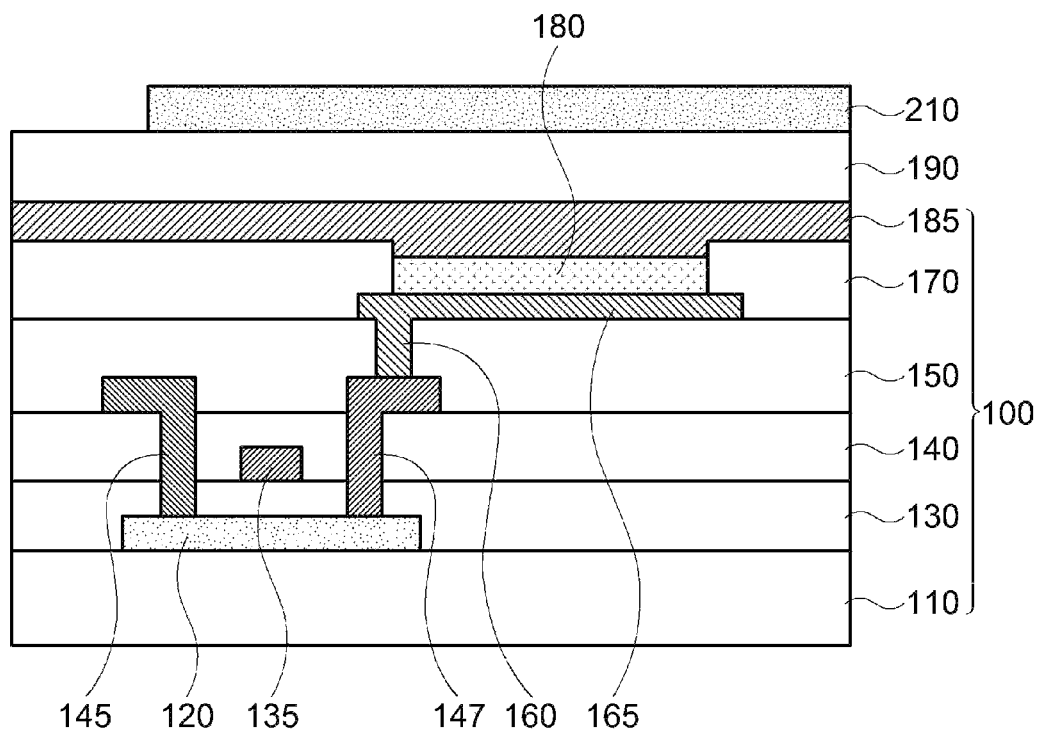
FIG. 2 is a partial enlarged view of a region A in FIG. 1.

FIG. 2 is a partial enlarged view of a region A in FIG. 1. For example, FIG. 2 illustrates an electrode construction including a thin film transistor included in the display panel 100 and an arrangement of the antenna electrode layer 210.

Referring to FIG. 2, the display panel 100 illustrated in FIG. 1 may include a thin film transistor (TFT) array and a display structure disposed on a panel substrate 110. The thin film transistor array may be formed by arranging a plurality of thin film transistors.

The thin film transistor may include an active layer 120, a gate electrode 135, a source electrode 145 and a drain electrode 147. The display structure may include a pixel electrode 165, a display layer 180 and an opposing electrode 185.

The panel substrate 110 may include glass or a flexible resin material such as polyimide. The active layer 120 may include amorphous polysilicon or a semiconductor oxide (e.g., indium-gallium-zinc oxide (IGZO) or indium-tin-gallium oxide (IGTO)).

In some embodiments, a barrier layer including an inorganic insulating material such as a metal oxide, silicon oxide, silicon nitride, etc., may be formed on the panel substrate 110, and the active layer 120 may be formed on the barrier layer.

A gate insulation layer 130 covering the active layer 120 may be formed on the panel substrate 110, and the gate electrode 135 may be formed on the gate insulation layer 130. The gate insulation layer 130 may include an inorganic insulation material such as a metal oxide, silicon oxide, silicon nitride, silicon oxynitride, etc.

An insulating interlayer 140 covering the gate electrode 135 may be formed on the gate insulation layer 130. The source electrode 145 and the drain electrode 147 may contact the active layer 120 through the insulating interlayer 140 and the gate insulation layer 130. The source electrode 145 and the drain electrode 147 may contact both sides of the active layer 120 with respect to the gate electrode 135.

A via insulation layer 150 covering the source electrode 145 and the drain electrode 147 may be formed on the insulating interlayer 140. The pixel electrode 165 may be electrically connected to the drain electrode 147 through a via portion 160 penetrating the via insulation layer 150. The pixel electrode 165 and the via portion 160 may be a single member integrally connected to each other.

The pixel electrode 165 may serve as, e.g., an anode of the image display device. The pixel electrode 165 may be provided individually for each pixel of the image display device.

A pixel defining layer 170 may be formed on the via insulation layer 150 to at least partially expose a top surface of the pixel electrode 165. The display layer 180 may be formed on the exposed top surface of the exposed pixel electrode 165.

The display layer 180 may include an organic light emitting layer. In this case, the image display device may be provided as an organic light emitting diode (OLED) display device. In an embodiment, the display layer 180 may further include a hole transport layer or an electron transport layer, and the organic light emitting layer may be disposed between the hole transport layer and the electron transport layer.

In some embodiments, the display layer 180 may include a liquid crystal layer. In this case, the image display device may be provided as a liquid crystal display (LCD) device.

The opposing electrode 185 may be disposed on the pixel defining layer 170 to cover the display layer 180. The opposing electrode 185 may serve as, e.g., a cathode of the image display device. Further, the opposing electrode 185 may be formed as a common electrode that may be continuously provided on a plurality of pixels.

The encapsulation layer 190 may be disposed on the opposing electrode 185, and the antenna electrode layer 210 may be disposed on the encapsulation layer 190.

The gate electrode 135, the source electrode 145, the drain electrode 147 and the pixel electrode 165 may include a low resistance metal such as silver (Ag), gold (Au), copper (Cu), molybdenum (Mo), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn) or an alloy containing at least one of the metals.

The opposing electrode 185 may include a transparent metal oxide such as indium tin oxide (ITO), indium zinc oxide (IZO), indium zinc oxide (ITZO), zinc oxide (ZnOx) to improve transmittance of the image display device.

In exemplary embodiments, an electrode structure included in the display panel 100 may serve as a ground layer of the antenna pattern 200 or the antenna electrode layer 210.

In some embodiments, the antenna electrode layer 210 may overlap at least one of the source electrode 145, the gate electrode 135, the drain electrode 147 and the pixel electrode 165 included in the display panel 100 in a height direction or a thickness direction of the image display device. Accordingly, at least one of the source electrode 145, the gate electrode 135, the drain electrode 147 and the pixel electrode 165 may serve as the ground layer of the antenna electrode layer 210.

In some embodiments, the antenna electrode layer 210 may overlap the pixel electrode 165 so that the pixel electrode 165 may substantially serve as the ground layer of the antenna electrode layer 210.

In exemplary embodiments, the encapsulation layer 190 may serve as a dielectric layer of the antenna electrode layer 210. Additionally, at least one insulation layer included in the display panel 100 may also serve as the dielectric layer.

For example, the pixel defining layer 170, the via insulation layer 150 and/or the insulating interlayer 140 may also serve as the dielectric layer. The pixel defining layer 170, the via insulation layer 150 and the insulating interlayer 140 may include an organic insulation material such as an acrylic-based resin, a siloxane-based resin or a polyimide-based resin, or an inorganic insulation material such as silicon oxide, silicon nitride, silicon oxynitride, etc.

As described above, an insulation structure or an electrode structure of the display panel 100 may serve as the dielectric layer and the ground layer of the antenna pattern 200 so that an antenna radiation/operation may be implemented without an additional formation or insertion of an antenna dielectric layer and an antenna ground. Thus, a thickness of the image display device may be decreased while preventing an operational interruption of the display panel 100 by the antenna ground.

Figure 3:
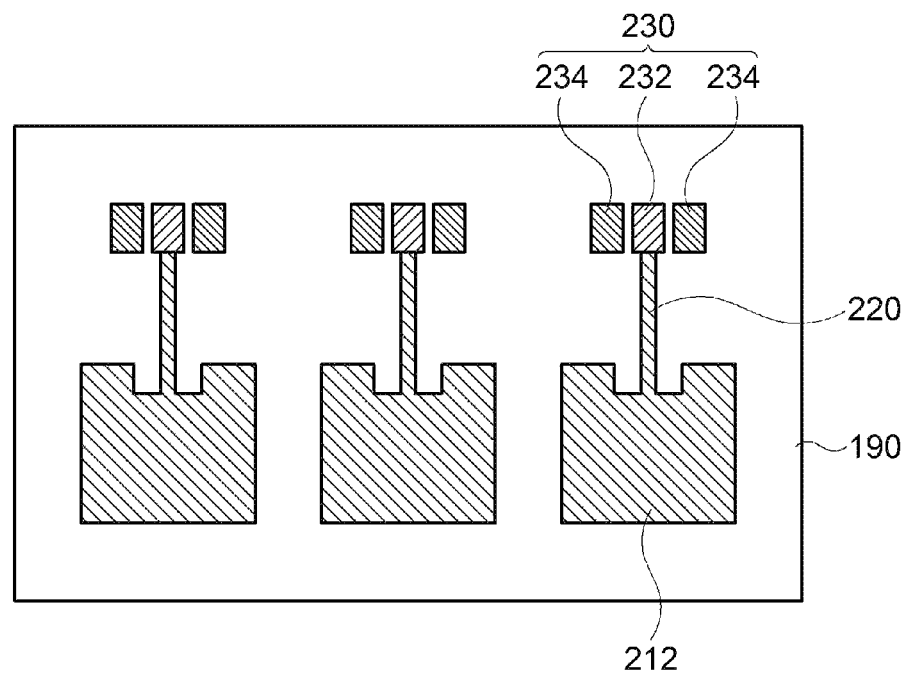
FIG. 3 is a schematic top planar view illustrating a pattern construction of an antenna in accordance with exemplary embodiments.

FIG. 3 is a schematic top planar view illustrating a pattern construction of an antenna in accordance with exemplary embodiments.

Referring to FIG. 3, as described with reference to FIGS. 1 and 2, for example, the antenna pattern 200 including the antenna electrode layer 210 may be disposed on the encapsulation layer 190. As illustrated in FIG. 3, a plurality of the antenna patterns 200 may be arranged on the encapsulation layer 190.

The antenna electrode layer 210 may include a radiator 212, a transmission line 220 and a pad 230. The pad 230 may include a signal pad 232 and a ground pad 234.

The radiator 212 may have, e.g., a polygonal plate shape, and the transmission line 220 may extend from a central portion of the radiator 212 to be electrically connected to the signal pad 232. The transmission line 220 may be formed as a single member substantially integral with radiator 212.

In some embodiments, a pair of the ground pads 234 may face each other with respect to the signal pad 232. The ground pads 234 may be electrically separated from the signal pad 232 and the transmission line 220.

As described with reference to FIGS. 1 and 2, the antenna electrode layer 210 may overlap the electrode structure included in the display panel 100 in a planar view. For example, the radiator 212 of the antenna electrode layer 210 may entirely overlap the electrode structure included in the display panel 100.

In exemplary embodiments, the capping layer 250 illustrated in FIG. 1 may be formed on the signal pad 232. The capping layer 250 may include a relatively chemically stable transparent metal oxide. Thus, corrosion and oxidation caused when the signal pad 232 is exposed to an external air may be prevented.

In some embodiments, the capping layer 250 may also be formed on the ground pad 234.

Figure 4:
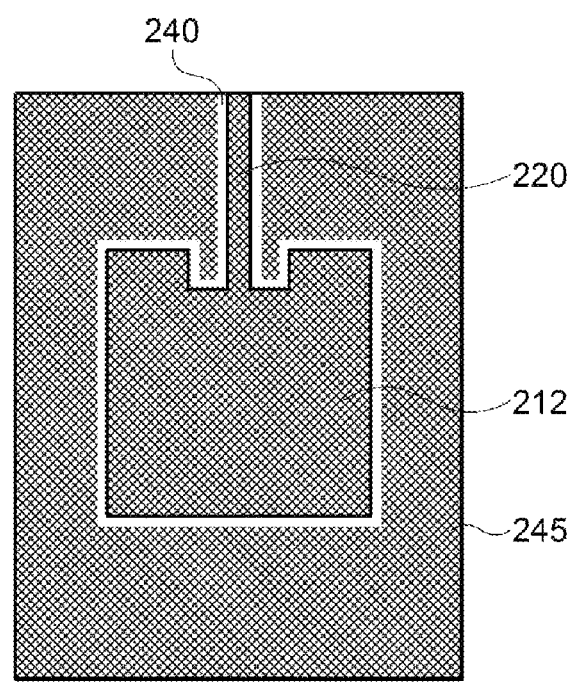
FIG. 4 is a schematic top planar view illustrating a pattern construction of an antenna in accordance with exemplary embodiments.

FIG. 4 is a schematic top planar view illustrating a pattern construction of an antenna in accordance with exemplary embodiments.

Referring to FIG. 4, a dummy pattern 245 of a mesh structure may be formed around the radiator 212. In an embodiment, the radiator 212 may also include a mesh structure substantially the same as or similar to that of the dummy pattern 245.

For example, the radiator 212 and the dummy pattern 245 may be separated and insulated from each other by a separation region 240 formed along a periphery of the radiator 212.

The radiator 212 and the dummy pattern 245 may be formed to include substantially the same or similar mesh structure so that a visual recognition of the radiator 212 due to a deviation of electrode pattern shapes may be prevented while improving a transmittance of the antenna electrode layer 210.

In some embodiments, the transmission line 220 extending from the radiator 212 may also include a mesh structure. In an embodiment, the pad 230 shown in FIG. 3 may have a solid pattern structure for improving a signal speed and reducing a resistance.

Figure 5:
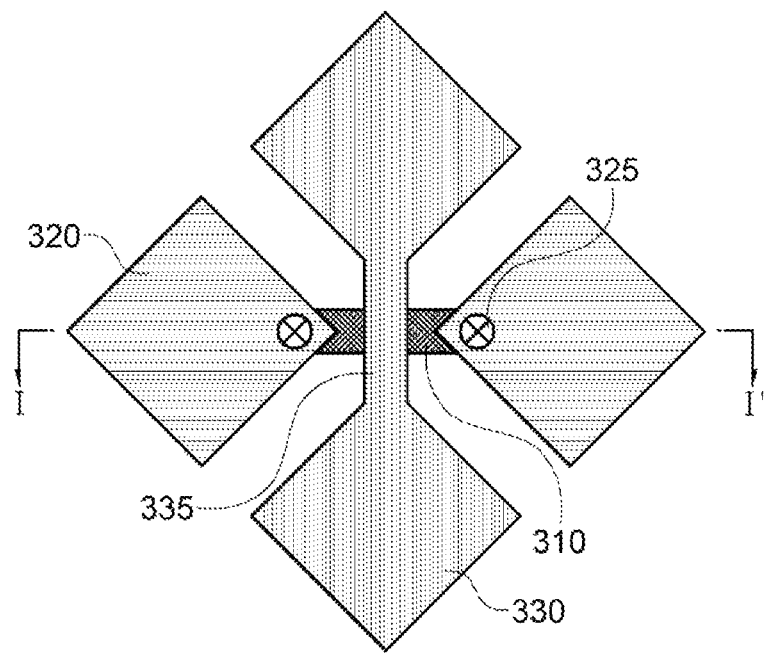
FIG. 5 is a schematic top planar view illustrating a touch sensor structure in accordance with exemplary embodiments.

FIG. 5 is a schematic top planar view illustrating a touch sensor structure in accordance with exemplary embodiments. For example, a cross-sectional view taken along a line I-I' of FIG. 5 is included as the touch sensor structure 300 in FIG. 1. For convenience of description, an illustration of the insulation pattern 340 is omitted in FIG. 5.

Referring to FIG. 5, the first sensing electrodes 320 may be arranged along, e.g., a row direction (e.g., X-direction). The second sensing electrodes 330 may be arranged along, e.g., a column direction (e.g., Y-direction).

The second sensing electrodes 330 neighboring in the column direction may be connected to each other through a connecting portion 335. The connecting portion 335 may be formed as a single member integrally connected to the second sensing electrodes 330. Accordingly, a plurality of the second sensing electrodes 330 may be electrically connected to each other to form a second sensing electrode column. A plurality of the second sensing electrode columns may be arranged along the row direction.

The first sensing electrodes 320 may each have an island-type unit electrode shape that may be physically separated from each other. The first sensing electrodes 320 facing each other with respect to the connecting portion 335 may be electrically connected to the bridge electrode 310 through a contact 325. The contact 325 may penetrate the insulating pattern 340 to connect the first sensing electrodes 320 neighboring each other.

Accordingly, a plurality of the first sensing electrodes 320 may be connected to each other in the row direction to define a first sensing electrode row. A plurality of the first sensing electrode rows may be arranged along the column direction.

As described with reference to FIG. 1, in some embodiments, the bridge electrode 310 may be formed by patterning the same conductive layer (e.g., a metal layer) as that for the antenna electrode layer 210, and the sensing electrodes 320 and 330 may be patterned from the same conductive layer (e.g., a transparent metal oxide layer) as that for the capping layer 250.

Thus, the antenna pattern 200 and the touch sensor structure 300 may be formed at the same level by substantially the same process.

Figure 6:
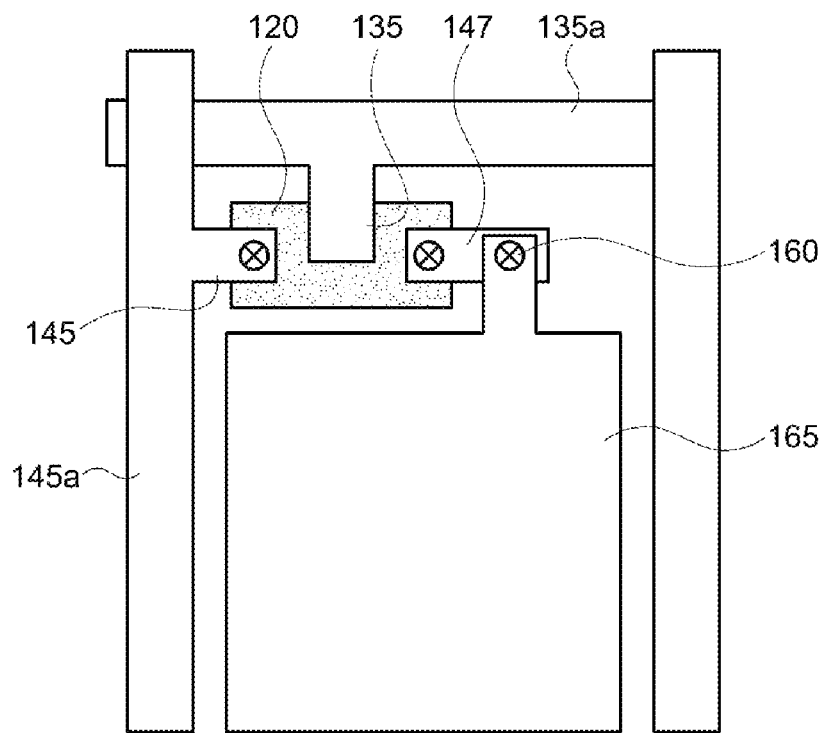
FIG. 6 is a schematic top planar view illustrating an electrode construction of a display panel in accordance with exemplary embodiments.

FIG. 6 is a schematic top planar view illustrating an electrode construction of a display panel in accordance with exemplary embodiments.

Referring to FIG. 6, a data line 145a and a scan line 135a may extend to cross each other. A plurality of pixels of an image display device may be defined by a plurality of the data lines 145a and the scan lines 135a crossing each other. Further, a thin film transistor may be arranged in each pixel.

The gate electrode 135 may be diverged from the scan line 135a and may protrude over the active layer 120. The source electrode 145 may be diverged from the data line 145a to protrude above one end of the active layer 120.

The drain electrode 147 may face the source electrode 145 with respect to the gate electrode 135. The source electrode 145 and the drain electrode 147 may contact both sides of the active layer 120.

The pixel electrode 165 may be electrically connected to the drain electrode 147 by the via portion 160.

As described with reference to FIG. 2, the source electrode 145, the gate electrode 135, the drain electrode 147 and/or the pixel electrode 165 may serve as a ground layer of the antenna pattern 200 or the antenna electrode layer 210.

In an embodiment, the radiator 212 of the antenna electrode layer 210 may entirely overlap the pixel electrode 165 in a planar view. In an embodiment, the transmission line 220 and the pad 230 of the antenna electrode layer 210 may at least partially overlap the source electrode 145, the gate electrode 135 and/or the drain electrode 147 in a planar view.

For example, the antenna electrode layer 210 may overlap an electrode region defined by the source electrode 145, the gate electrode 135, the drain electrode 147 and the pixel electrode 165 which may include a low resistance metal in the planar view so that a radiation noise from the antenna electrode layer 210 may be effectively removed or shielded.

What is claimed is:

1. An image display device, comprising:
    a display panel including a panel substrate, and an electrode structure and an insulation structure stacked on the panel substrate;
    a touch sensor structure on the display panel; and
    an antenna electrode layer disposed on the display panel at the same level as that of the touch sensor structure, the antenna electrode layer at least partially overlapping the electrode structure of the display panel in a thickness direction,
    wherein the electrode structure includes a gate electrode, a source electrode, a drain electrode and a pixel electrode,
    wherein the electrode structure serves as a ground layer of the antenna electrode layer,
    wherein the antenna electrode layer includes a radiator and the radiator entirely overlap the pixel electrode in a planar view.

2. The image display device according to claim 1, wherein the touch sensor structure includes:
    first sensing electrodes and second sensing electrodes arranged along different directions crossing each other; and
    bridge electrodes electrically connecting the neighboring first sensing electrodes.

3. The image display device according to claim 2, wherein the antenna electrode layer and the bridge electrode are disposed at the same level and include the same metal.

4. The image display device according to claim 1, further comprising an encapsulation layer disposed between the display panel and the antenna electrode layer.

5. The image display device according to claim 4, wherein the encapsulation layer serves as a dielectric layer of the antenna electrode layer.

6. The image display device according to claim 4, wherein the insulation structure of the display panel includes a gate insulation layer, an insulating interlayer, a via insulation layer and a pixel defining layer sequentially stacked on the panel substrate,
    wherein at least a portion of the insulation structure serves as the dielectric layer of the antenna electrode layer together with the encapsulation layer.

7. The image display device according to claim 4, wherein the touch sensor structure is disposed on a central portion of the encapsulation layer, and the antenna electrode layer is disposed on a peripheral portion of the encapsulation layer.

8. An image display device comprising:
    a display panel including a panel substrate, and an electrode structure and an insulation structure stacked on the panel substrate;
    a touch sensor structure on the display panel including first and second sensing electrodes;
    an antenna electrode layer disposed on the display panel at the same level as that of the touch sensor structure, the antenna electrode layer at least partially overlapping the electrode structure of the display panel in a thickness direction; and
    a capping layer on a portion of the antenna electrode layer,
    wherein the capping layer is disposed at the same level as that of the first and second sensing electrodes, and includes a transparent metal oxide.

9. The image display device according to claim 8, wherein the antenna electrode layer includes a radiator, a transmission line extending from the radiator and a signal pad connected to an end portion of the transmission line,
    wherein the capping layer is disposed on the signal pad.

10. The image display device according to claim 9, further comprising a ground pad disposed around the signal pad to be electrically separated from the signal pad and the transmission line.

* * * * *